Patented Apr. 28, 1942

2,281,528

UNITED STATES PATENT OFFICE 2,281,528

METHOD OF HEATING AND MELTING PRECIOUS METALS AND FLUX COMPOSITION THEREFOR

Herbert R. Berger, Brooklyn, N. Y., assignor to J. F. Jelenko & Co. Inc., New York, N. Y., a corporation of New York No Drawing. Application April 22, 1940, Serial No. 330,898

11 Claims. (Cl. 75—65)

This invention relates to the heating and melting of precious metals and is more particularly concerned with the heating and melting of gold alloys or casting golds.

In its more specific aspects the invention relates to the heating and melting of gold alloys for dental and jewelry purposes and more especially in melting the gold in a furnace preliminary to the casting thereof in a mold.

One object of the invention is to provide an improved method of heating or melting gold alloys and other precious metals in such manner as to prevent oxidation of the metal which might otherwise result during the heating or melting thereof. This object is accomplished in accordance with the present invention by heating or melting the metal in a carbon crucible and in the presence of a flux containing carbonaceous material which acts as a reducing agent. The flux also contains sodium chloride (NaCl) which upon melting, during the melting of the metal, forms a glassy film over the metal and protects the latter against oxidation. The carbonaceous material contained in the flux is preferably potassium bitartrate ($KHC_4H_4O_2$) which decomposes at about 1300° F. resulting in the liberation of free carbon and the formation of hydrocarbons which act as reducing agents on the surface of the metal. The flux also preferably contains powdered charcoal which also acts as a reducing agent uniting with oxygen to form carbon monoxide (CO) which upon burning in the crucible forms carbon dioxide ($CO_2$). I have discovered that the action of the flux for preventing oxidation of the metal is greatly improved when the metal is heated in a carbon crucible.

Another object of the invention is the provision of an improved flux composition for use in the melting of gold or other precious metals to prevent oxidation thereof.

In accordance with the present invention the gold or other precious metal is melted in a carbon crucible, and more particularly, in the case of melting gold preparatory to forming castings for dental purposes, said gold may be melted in the crucible of a dental casting apparatus such, for example, as that illustrated and described in my application Serial No. 182,600, filed December 30, 1937, now Patent 2,209,381, granted July 30, 1940, in which the use of a carbon crucible for melting gold is described. As shown in said application, alundum may be present in the interior of the furnace, since as described in said application the dam 50 is composed of alundum. Furthermore, in centrifugal furnaces of the type referred to not only is alundum cement used for covering the electric resistance winding, as described in said application, but the muffle itself and the closure for the intake opening of the furnace are customarily made of alundum. As stated above, the gold is heated and melted in the presence of a flux containing a substance such as sodium chloride for forming a protective film over the metal and a carbonaceous substance such, for example, as potassium bitartrate which acts as a reducing agent to protect the metal from oxidation. The preferred flux utilized in accordance with the present invention consists of sodium chloride, potassium bitartrate and powdered charcoal in the preferred proportion, by weight, of 50% of sodium chloride, 45% potassium bitartrate, and 5% powdered charcoal. In lieu of this flux composition I can utilize a flux consisting of 50% sodium chloride and 50% crude argols, this composition being approximately the same as the first mentioned composition inasmuch as crude argols is composed of approximately 90% potassium bitartrate and 10% organic impurities including carbon. It will be understood that while the proportions of the ingredients in the flux compositions are preferable, as hereinbefore stated, said proportions can be varied within certain limits, for example, to the extent of about 10% plus or minus in respect to each of the ingredients. For best results in melting gold the flux is used in the proportion of 5 grains of flux per pennyweight of casting gold.

It will be understood that in melting gold in accordance with the present invention the gold and the flux are placed in a carbon crucible and the gold is heated in said crucible in the presence of said flux to a temperature in excess of the upper melting range of the gold, the temperature being from about 50° F. to about 400° F. above the upper limit of the melting range. For example, when denture gold is melted the temperature at which the gold is heated in the presence of the flux is about 1720° F. and for inlay gold the temperature to which the gold is heated in the presence of the flux is about 2000° F. During the heating of the gold in the crucible in the presence of the flux of the first mentioned composition, the sodium chloride melts at 1479° F. and forms a glassy film over the metal that protects it from oxidation; the potassium bitartrate decomposes at about 1300° F. resulting in the liberation of free carbon and in the formation of hydrocarbons that act as reducing agents on the surface of the metal; and the free powdered charcoal unites with oxygen forming first carbon monoxide and then carbon dioxide thus adding to the reducing effect to prevent oxidation of the metal. As hereinbefore stated, the action of the flux for preventing oxidation of the metal alloy is very substantially improved when the metal is heated in a carbon crucible because, as I have discovered, carbon derived from the crucible is highly beneficial to the reducing action.

In performing the above described method the gold is preferably melted in the crucible of a dental casting apparatus such, for example, as that disclosed in my above mentioned application, and the molten gold is transferred, in the operation of the apparatus from the crucible to the mold for forming the casting. It is, however, within the scope of the present invention to heat gold articles in the carbon crucible, without melting the gold, whereby to reduce oxidation and thereby brighten the surfaces of such articles which have previously been oxidized and thus darkened in the course of their manufacture.

While I have described the preferred method of practicing the invention and the preferred flux composition, it will be understood that certain variations in the method and in the flux composition can be made without departing from the spirit of the invention. Accordingly, I do not wish to be limited to the specific method or to the specific flux composition hereinbefore described except to the extent which may be required by the scope of the appended claims.

Having thus described my invention, what I claim and desire to secure by Letters Patent is:

1. The method of treating a precious metal alloy subject to oxidation when heated, according to which there is utilized a centrifugal furnace having alundum in the interior thereof, which comprises heating such metal alloy in said furnace in the presence of a flux which is inert to alundum and which contains potassium bitartrate.

2. The method of treating a precious metal alloy subject to oxidation when heated, according to which there is utilized a furnace having alundum in the interior thereof, which comprises heating such metal alloy in said furnace in the presence of a flux which is inert to alundum and which contains sodium chloride and potassium bitartrate.

3. The method of treating a precious metal alloy subject to oxidation when heated, according to which there is utilized a furnace having alundum in the interior thereof, which comprises heating such metal alloy in a crucible of carbonaceous material in said furnace and in the presence of a flux which is inert to alundum and which contains sodium chloride and potassium bitartrate.

4. The method of melting a gold alloy preparatory to casting the same in a mold, according to which there is utilized a furnace having alundum in the interior thereof, which comprises heating said gold alloy in said furnace at a melting temperature in the presence of a flux which is inert to alundum and which contains sodium chloride and potassium bitartrate.

5. The method of melting a gold alloy preparatory to casting the same in a mold, according to which there is utilized a centrifugal furnace having alundum in the interior thereof and which method comprises heating said gold alloy in a carbon crucible in said furnace at a melting temperature in the presence of a flux which is inert to alundum and which contains sodium chloride and potassium bitartrate.

6. The method of melting a gold alloy preparatory to casting the same in a mold, according to which there is utilized a furnace having alundum in the interior thereof and which method comprises heating said gold alloy in a carbon crucible in said furnace at a melting temperature in the presence of a flux which is inert to alundum and which contains sodium chloride and potassium bitartrate and powdered charcoal.

7. The method of melting a gold alloy preparatory to casting the same in a mold, according to which there is utilized a furnace having alundum in the interior thereof and which method comprises heating said gold alloy in a carbon crucible in said furnace at a melting temperature in the presence of a flux which is inert to alundum and which is of substantially the following composition: about 50% sodium chloride, about 45% potassium bitartrate, and about 5% charcoal.

8. A flux composition for use in melting a precious metal alloy, said flux comprising sodium chloride and potassium bitartrate whereby to prevent oxidation of said alloy when the latter is heated, said flux being further characterized by its inertness to said alloy whereby to prevent any change in the composition of said alloy when melted in the presence of said flux.

9. A flux composition for use in melting a precious metal alloy, said flux comprising sodium chloride and potassium bitartrate in substantially equal proportions by weight whereby to prevent oxidation of said alloy when the latter is heated, said flux being further characterized by its inertness to said alloy whereby to prevent any change in the composition of said alloy when melted in the presence of said flux.

10. A flux composition for use in melting a precious metal alloy, said flux comprising sodium chloride and potassium bitartrate and charcoal whereby to prevent oxidation of said alloy when the latter is heated, said flux being further characterized by its inertness to said alloy whereby to prevent any change in the composition of said alloy when melted in the presence of said flux.

11. A flux composition for use in melting a precious metal alloy, said flux comprising sodium chloride and crude argols whereby to prevent oxidation of said alloy when the latter is heated, said flux being further characterized by its inertness to said alloy whereby to prevent any change in the composition of said alloy when melted in the presence of said flux.

HERBERT R. BERGER.